United States Patent [19]
Barnard

[11] 3,780,579
[45] Dec. 25, 1973

[54] DIGITAL INTEGRATING FLOWMETER
[75] Inventor: Ronald K. Barnard, Tuscola, Ill.
[73] Assignee: National Distillers and Chemical Corporation, New York, N.Y.
[22] Filed: Feb. 2, 1972
[21] Appl. No.: 222,968

[52] U.S. Cl. .......... 73/229 R, 73/194 R, 235/92 FL
[51] Int. Cl. ................................................ G01f 1/00
[58] Field of Search ...................... 73/194 R, 194 E, 73/194 M, 229, 230, 231 R, 231 M; 235/151.34, 92 FL, 92 FQ; 328/45, 50

[56] References Cited
UNITED STATES PATENTS
3,340,386    9/1967    Hurst ............................ 73/194 R X FOREIGN PATENTS OR APPLICATIONS
830,449    3/1960    Great Britain ................... 73/194 M Primary Examiner—Richard C. Queisser
Assistant Examiner—John P. Beauchamp
Attorney—Allen A. Meyer, Jr. et al.

[57] ABSTRACT

Apparatus adapted to measure fluid flow in a pulsating flow system, such system being characterized by wide variations in flow rate over a predetermined cycle of operation. Reliability in measurement is achieved by counting the pulses, the frequency of which is determined by instantaneous flow rate, over a time interval which is at least approximately as long as the operating cycle for the system. The apparatus also possesses the capability of adjusting for variation in specific gravity of the fluid and, generally, of providing direct readouts in various units of measurement.

15 Claims, 6 Drawing Figures

INTEGRATOR TIME SETTING
100% C$_2$H$_4$

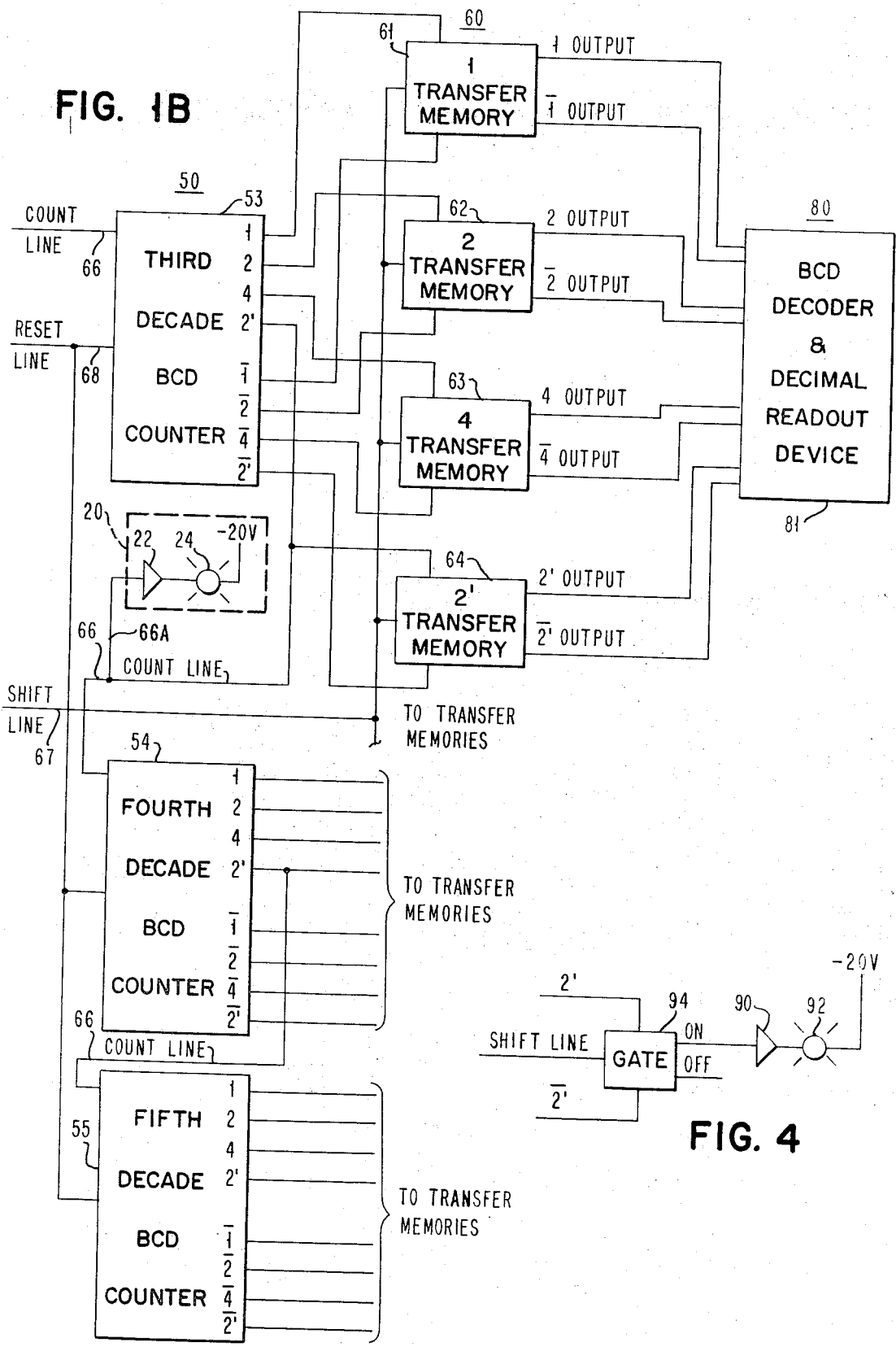

DIGITAL INTEGRATING FLOWMETER

BACKGROUND, OBJECTS AND SUMMARY OF THE INVENTION

The present invention relates to flowmeters and more particularly to flowmeters adapted to measure flow rate in a reactor system involving high pressure fluid flow.

Flowmeters have become known in the art which feature a turbine device having a rotor which is actuated by fluid flow causing the turbine to rotate in a magnetic field, the rate of rotation being proportional to the fluid flow rate. In one application of such a turbine device, the rotation causes disturbances in the magnetic field which are detected and transmitted by a pick-up device as a sinusoidal voltage variation. The frequency of the sine wave is accordingly proportional to the flow rate. The sine wave signal is thereafter amplified, limited, and is then applied as a square wave through a diode bridge to a resistor-capacitor circuit. The discharge of the capacitor through the circuit resistance is measured on a microammeter. Because of the time intervals involved in various segments of the circuit, a constant flow rate, hence a constant frequency pulse train, will produce a constant meter reading. This type of flowmeter device has been found to be quite accurate for certain applications.

Serious drawbacks are encountered, however, when the aforenoted type of flowmeter is to be applied in a reactor system involving pulsating fluid flow. Such pulsating fluid flow is present for example when compressors and intensifiers are utilized in the reactor system. Thus, when a compressor is delivering, a high flow rate is observed; conversely, when the compressor is taking in gas for the next stroke, the flow rate drops off considerably. The normal response time for a conventional instrument is sufficiently fast so as to allow the meter to follow these changes in flow rate. Depending on the flow rate and usable volume of the compressor, this variation may take place many times a minute, causing the read-out to fluctuate as much as 30 percent of full scale. This makes for great inaccuracies since a high degree of human judgement is required to time average the high and low readings. It is not uncommon for two operators taking a reading at the same time, to have their data vary by 20 percent. Obviously much more reliable apparatus is needed, particularly when attempting to develop appropriate engineering data.

Accordingly, it is a primary object of the present invention to overcome the aforesaid drawbacks and to provide apparatus that will insure great reliability in measuring fluid flow in a pulsating flow system.

Another object is to obtain a direct decimal read-out of the fluid flow rate in a variety of units of measurement.

Yet another object is to store the digital information with respect to the pulse count for an extended time period and to provide a visual presentation of such data during such period.

A more specific object of the present invention is to provide a flowmeter having the capability to adjust to variations in specific gravity while providing a direct decimal readout of flow rate.

The above and other objects are achieved by the several features of the present invention. One of these features resides in the provision of counting the generated pulses corresponding to instantaneous flow rate over a time interval which is at least approximately as long as the operating cycle for the flow system. For such purpose, a counter bank is provided comprising a group of five binary-coded-decimal counters including the facility for read-out on the last three counters. The size of the counter bank is chosen on the basis of the number of pulses produced by the volume of measured fluid passing through the turbine in a time interval exceeding the expected cycle time of the compressor. This will, in effect, time average the flow rate over the compressor cycle. A normal compressor cycle will occur in a little less than 1 minute. Thus the counter bank is sized to register all of the pulses put out by the turbine in 2 minutes of average flow. The timing device which sets the time interval for the counting of pulses is selected to have a range of approximately 0 – 150 seconds.

Another feature of the present invention resides in the fact that the time interval for pulse counting can be varied by the timing device so that this device effectively constitutes a means adapted to select the cycle time in such a way that a direct decimal read-out of flow rate can be obtained. The counting time interval for any particular fluid is calculated from a knowledge of the density of fluid to be measured and also the turbine calibration. This particular aspect will be made apparent hereinafter.

In order that information will be available as to the instantaneous flow rate, thus avoiding any difficulties because of the fact that time averaging is employed with respect to the main read-out, a simple indicator means suitably connected to the turbine output is provided.

Further objects, features and advantages of the present invention will become readily apparent as the following description of a specific embodiment of the invention proceeds, taken in conjunction with the drawings wherein:

BRIEF DESCRIPTION OF THE DRAWINGS

FIG. 1A is a block diagram of the front end of the apparatus, including the logic circuits, timing device, and certain of the counters.

FIG. 1B is a block diagram of the remainder of the apparatus, including the other counters and transfer memory, decoder and display devices.

FIG. 4 is a block diagram of an override indicator circuit.

Before proceeding with a detailed description of the apparatus of the present invention, it is well to consider the entire system as being made up of a number of functional blocks. In essence, the system comprises a means for generating pulses in accordance with the instantaneous flow rate combined with means for counting the number of said pulses over a time interval at least approximately as long as a predetermined cycle of operation, that is, the cycle of operation for the device responsible for the pulsating kind of flow, the rate of which is to be measured. Further included in the system as an important functional component is a timing device which sets the time interval for the counting of pulses, as these are transmitted from the pulse generating means. The time interval set by the timing device is referred to as the "cycle time" because it corresponds roughly, as indicated previously, with the time required for the cycle of operation of the device of interest, that is, the device whose pulsating flow is to be measured.

At the end of the appropriately set time interval the pulse count is transferred from a bank or group of counters to suitably arranged transfer memories which have the capability of storing the pulse count while the bank of counters are reset to count pulses during the succeeding time interval. The count as retained or stored in the transfer memories is in binary coded decimal form. To convert a direct decimal digit read-out conventional BCD decoders are employed in association with digital read-out devices that provides a visual display of the decimal value or count over the set time interval.

Figure 1:
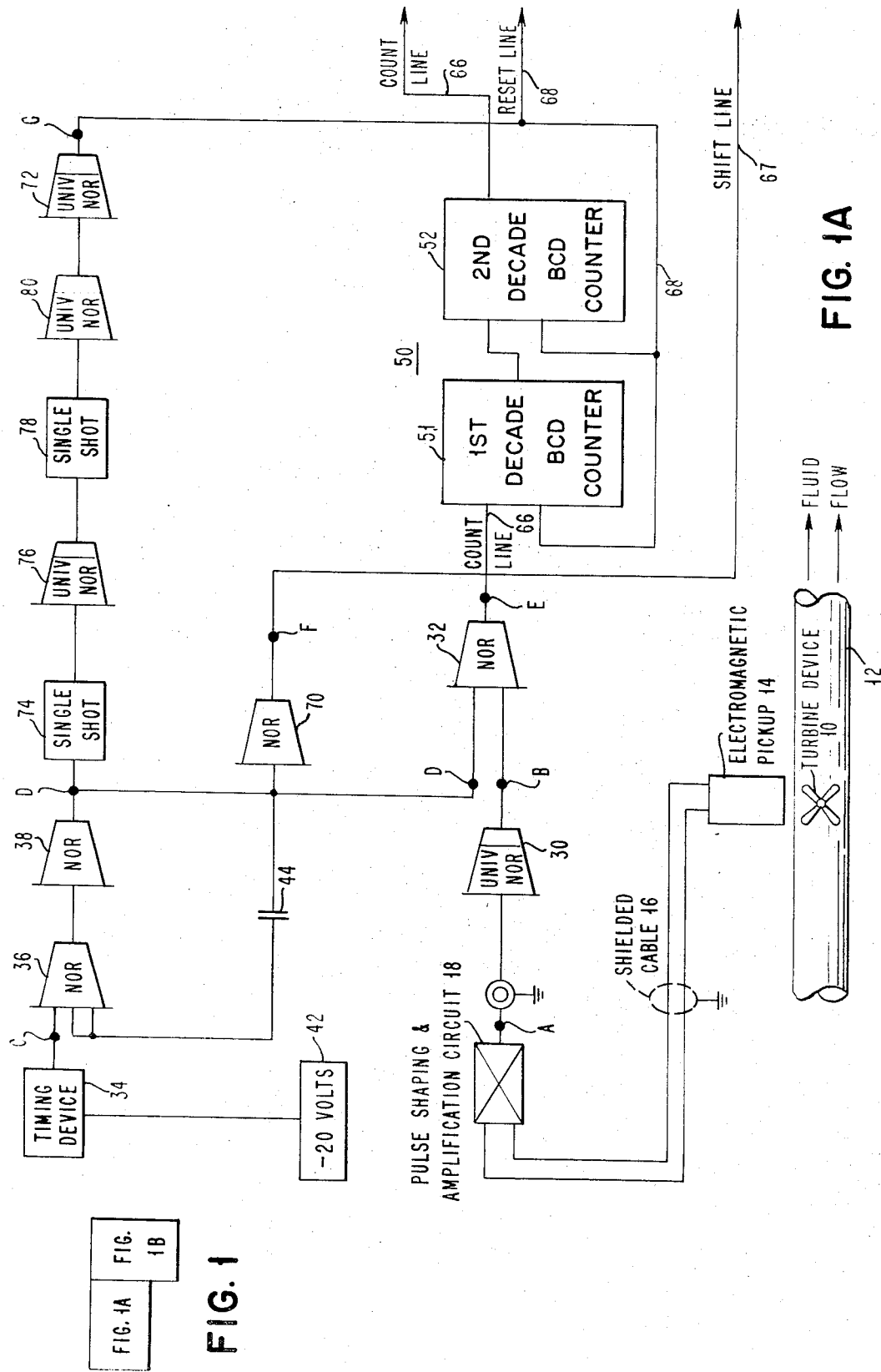
FIG. 1 is a layout of the block diagrams illustrating the apparatus of the present invention.

As shown in FIG. 1A a turbine device 10 is disposed within a pipe 12 which is so connected to the pulsating flow system of interest that the fluid flow therein actuates the suitably spaced blades on the rotor of turbine device 10. Accordingly, the turbine device rotates at a rate dependent on the rate of fluid flow through pipe 12. An electromagnetic pickup 14 is mounted on the outside of pipe 12 adjacent to the turbine device 10 so that as the turbine rotor rotates disturbances in the magnetic field thus caused are detected and transmitted by the pickup 14 as a sinusoidal voltage variation. The frequency of the sine wave is proportional to the flow rate. The sine wave signal is transmitted by way of shielded cable 16 to pulse shaping and amplification circuit 18. The signal at the output of circuit 18 is a series of square wave pulses.

Pulses leaving the circuit 18 enter the logic circuitry of the integrating flow meter of the present invention. It will be seen by reference to FIG. 1A that the logic circuitry is made up of solid state logic "blocks" or "packs." These blocks or packs are readily available and are manufactured by a variety of integrated circuit manufacturers. Typical blocks or packs that are used in the illustrated logic circuitry embody NOR devices, universal NOR devices and single shot devices. It should be explained that a universal NOR and a standard NOR function in the same manner; that is, they both provide the same output in response to a given input, the difference being that the universal NOR provides the current amplification required to drive more subsequent units than is possible with the standard NOR.

Accordingly, the pulse train from the output of circuit 18 enters the universal NOR device 30 and thereafter proceeds to gating NOR device 32. The gating action of NOR device 32 is controlled by the timing device 34 (seen at upper left in FIG. 1A) which is used for setting the desired time interval for the counting of pulses.

Figure 2:
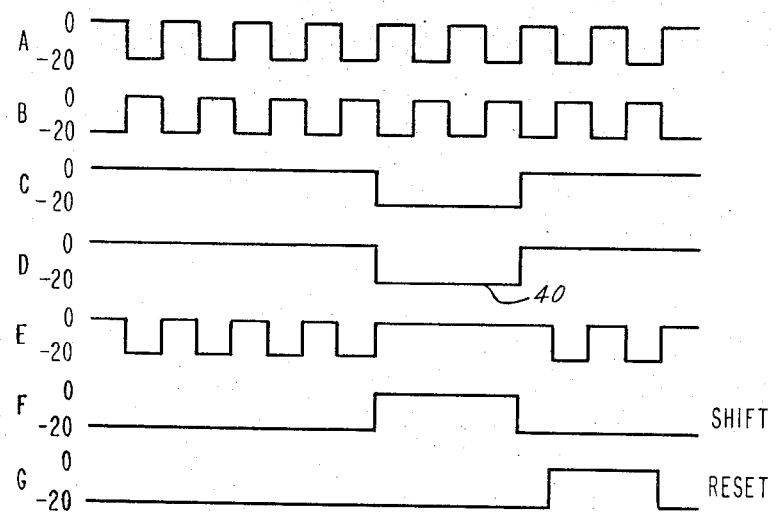
FIG. 2 is a waveform diagram showing the timing sequence in the logic circuitry.

Reference to the waveform diagram of FIG. 2 will make clear the timing sequence in the logic circuitry thus far discussed. The pulse train A illustrated in FIG. 2 appears at the point A, which corresponds to the output of the circuit 18. In the logic circuitry of logical "1" corresponds to a voltage level of minus 20 volts whereas a logical "0" corresponds to a voltage level of zero volts. Accordingly, the output pulse train at the point B, corresponding to the output of universal NOR device 30, is inverted from the pulse train as it appears at point A. The logic of NOR device 32 is such that the output thereof will be 1 so long as there are logical zeros present at the inputs. Accordingly, when the voltage level at point B is zero volts and the voltage level at point D is also zero volts, there are logical zeros present at both inputs; the outputs of NOR device 32 will be a logical "1," as can be seen by reference to the waveform at point E, which is at the output of NOR device 32.

During the timing interval, which is also referred to as "cycle time," the relay contacts of timing device 34 are in the open state with the result that the voltage level at point C is zero volts (logical "0"). Because of the presence of NOR devices 36 and 38 the output or the waveform at point D corresponds with that at point C. Hence, with the relay contacts open, the voltage level at point D is zero volts.

Consequently, pulses to be counted are gated through NOR device 32. At the end of the cycle time for the timing device 34, its relay contacts close for a short time. This short interval of time is designated 40 on the waveform D. During this time, a minus 20 volts signal from the source 42 is applied to point C at the input of NOR device 36. It will be noted that a capacitor 44 is placed at the other inputs to NOR device 36. This is done to eliminate spurious signals resulting from contact bounce when the relay contacts are closing. The 20 volts signal applied for said short interval turns off NOR device 36 causing turn-on of NOR device 38 with the previously noted result that th waveform appearing at D follows the waveform C. Hence a −20 volt signal representing a logical "1" appears during this short interval at point D. This prevents any further pulses at the input point B from being gated through NOR device 32 into the counting portion of the system. Therefore, application of this −20 volt signal at the input of device 32 is effective to terminate the counting of pulses that are generated by turbine 10.

The timing device 34 may take the form of an electrically operated timer, preferably a timer manufactured by the Eagle Singal Company, Model No. HP702A6. Such a timer is driven through a solenoid-operated clutch and gear train to a synchronous motor during the preset "cycle time." At the end of the cycle, a suitably provided relay is closed for a brief period (less than 1 second), after which the clutch solenoid is energized. The timer is automatically reset by spring action to a mechanical stop. The solenoid is then de-energized and the cycle restarted. The cycle time is determined by resetting a mechanical stop on the spring return.

During the timing interval when pulses transmitted from turbine device 10 are being counted, the NOR device 32 having been enabled, the series or train of pulses in waveform E are being sent to the bank or group of counters, designated by the numeral 50. Five counters for handling of five decades in the decimal system are utilized and these are designated by numerals 51–55. The first two decade counters, i.e., counters 51 and 52, as seen in FIG. 1A, handle the least significant digits, while the last three decade counters, i.e., counters 53, 54 and 55, as seen in FIG. 1B, handle the most significant digits.

Each of the counters 51–55 is constructed of four conventionally connected flip-flops or similar binary devices (not shown) which are arranged so that a decimal count can be achieved. It will be understood that different forms of conventional binary coded decimal (BCD) counters are available and can be chosen, each of which relies on a different coding scheme. As will be appreciated by reference to counters 53–55, in the particular example illustrated, the type of counter selected is one employing a "gap six" code. Of course, these upper four outputs from each of the counters correspond respectively with the outputs from one side of the suitably connected four flip-flops included therein. On the other hand, the lower four outputs, designated $\bar{1}, \bar{2}, \bar{4}, \bar{2}$, correspond respectively with the outputs from the other side of the four flip-flops; therefore, the resulting logical inversion is apparent.

Each of the counters 53–55 has its eight outputs connected to a set of transfer memories generally designated 60. However, the complete set of connections is illustrated only for the third decade counter, i.e., counter 53, which serves as the typical decade. It will be understood that the other counters, i.e., counters 54 and 55, are similarly connected. In contrast to counters 53–55, however, the counters 51 & 52, seen in FIG. 1A, are not connected to transfer memories since their digits are not considered significant and hence are not to be visually displayed. Nevertheless, counters 51 & 52 are interconnected with counters 53–55 for the purpose of recording the count of pulses over a predetermined time interval. This interconnection is by means of the COUNT LINE 66 which may be seen extending through all five decade counters 51–55.

Although it will be appreciated that successful exploitation of time averaging has been achieved by reason of the recording of the pulse count over the predetermined time interval, or cycle time, it is advantageous to be able to approximately monitor the instantaneous flow rate. To this end, as will be seen by reference to FIG. 1B an indicator circuit 20 is provided and is connected to COUNT LINE 66 at the output from the 2' stage, the connection being made by the line 66A. The indicator device includes a suitable output amplifier 22, which is merely a transistor "switch" which, when a logic 1 is applied to the input, operates to short the supply voltage of −20 volts through the indicator light 24 to ground, thereby causing sufficient current to be drawn so as to illuminate the light 24. Since only a qualitative indication is required, only a simple device, such as the light 24, will suffice for the purpose.

The set 60 of transfer memories is made up of four memory devices 61–64 which also bear the legends 1 TRANSFER MEMORY, 2 TRANSFER MEMORY, etc., in conformity with the "gap six" code designations. Each of these memory devices includes a flip-flop, or other binary storage device, for the purpose of storing a bit of information. All four memory devices 61–64 taken together store the third decade decimal digit in the selected binary coded form.

The transfer memories 61–64 are able to accept the accumulated count of pulses and store same only when the SHIFT LINE 67 has been appropriately activated. A signal is transmitted on line 67 for this purpose, appearing when the timing interval for pulse counting has terminated, i.e., when the relay contacts of timing device 34 hav closed. The signal takes the form of a positive-going pulse as may be seen in FIG. 2 (waveform F). This pulse appears at the output of the NOR device 70 in FIG. 1A (point F) and, of course, represents a logical "0." The transmission of this logical "0," by way of SHIFT LINE 67, to each of the transfer memories connected to the respective counters 53–55 is effective to enable conventional gates, which are included as parts of the transfer memories. As a result, the accumulated count present in the counters is transferred or shifted to the transfer memories.

In order that the counters may be readied for another count of pulses during a repetition of the selected time interval, or "cycle time," a reset signal is transmitted on RESET LINE 68 to all the counters 51–55. This signal takes the form of a positive-going pulse as may be seen in FIG. 2 (waveform G). The pulse appears at the output of UNIVERSAL NOR device 72 and represents a logical "0." This pulse is effective to reset all the counters to zero, but, of course, is not effective to do so until the count has been transferred, as described hereinabove. This result is achieved by reason of the delay provided by the circuit arrangement in FIG. 1A between points D & G. Thus it will be understood that the cascading of single-shot device 74, UNIVERSAL NOR 76, single-shot 78, UNIVERSAL NOR 80 and UNIVERSAL NOR 72 produces the waveform G according to which the leading edge of the present pulse is delayed about 500 milliseconds behind the shift signal. (waveform F)

The data that has been shifted into the typical transfer memories 61–64 is not affected by the reset operation, i.e., the count of pulses stored therein remains unchanged. Furthermore, the stored count is not affected by the next time interval during which a new count is taken, but is changed only when the next shift pulse appears. Accordingly, the particular object of the present invention is fulfilled of having a stored count which may be visually displayed for an extended time period, corresponding to the selected time interval for pulse counting.

The visual display of the stored count is accomplished by the apparatus designated 80 in FIG. 1B. The display is in the form of a direct decimal readout of the most significant digits. It will be appreciated that in addition to the typical decade display means 81, there are identical display mans connected to the transfer memories of the fourth decade counter 54 and the fifth decade counter 55.

The typical display means 81 comprises a BCD decoder device and a decimal readout device. The decoder is a device well-known in the art and may be in the form of a matrix connected, at its input, to the eight output lines of the transfer memories 61–64. The output of the matrix is connected to the decimal readout device and transmits the appropriate decimal values thereto in accordance with the binary coded information from th transfer memories. Since the chosen code is the "gap six" code, the BCD decoder is of the type that translates this code into decimal values.

The decimal readout device is preferably in the form of vacuum tubes which are especially adapted to illuminate selectively decimal indicia on the face of the tubes. Of course, suitable amplifiers are utilized in association with such tubes in order that they may be properly driven.

It will be appreciated from what has been said before that the display on the decimal readout device representing a previous pulse count will be retained until the timing device 34 completes its cycle and the SHIFT LINE is re-energized, whereby the new pulse count will be transferred to the transfer memories and displayed.

Although the five decade counter arrangement already described permits the counting of flow rates up to 999 pounds per hour, in certian situations the flow rate may be found to exceed this amount. It is therefore necessary in such situations to provide an override indication. This is accomplished by the circuit shown in FIG. 4. This circuit is very similar to the instantaneous flow rate indicator 20 previously described. Thus, it involves the interconnection of an amplifier 90 and an indicator light 92, the indicator light in turn being connected to a source of voltage having a value of −20 volts. The input to the amplifier 90 is derived from the output of gate 94 which is associated with the particular transfer memory connected to the fifth decade BDC counter 55. Accordingly, when the count exceeds 999 lbs., per hour, an output will be provided on the 2' line to the input of gate 94, with the consequence that a logical "1" output will appear at the "ON" output line to which the amplifier 90 is connected, whereby the indicator light 92 will indicate that the permissible limit has been exceeded.

As indicated hereinabove, a principal feature of the present invention resides in the facility for pre-determining and setting the counting time interval under certain circumstances. More particularly, the duration of the time interval, or "cycle time," can be established or set to compensate for fluid density changes in order that a direct decimal readout of fluid flow rate can be obtained. Such a readout can be, for example, in pounds per hour. In such a case, the time interval required to be established is calculated from a knowledge of the density of the material to be measured and the turbine calibration. The fact that the time interval is based on data obtained as a result of calibrating the turbine, using a standard fluid, usually water, means that great accuracy in measurement can be realized.

A sample calculation with water as the calibration fluid, is given below:

Cycle Time Calculational Method

From calibration date on Turbine No. 4443A:
Water used as calibration fluid
(Specific Gravity = 0.9899)

1. 300 cycles/sec = 411.147 lbs $H_2O$/hr.

For Ethylene at 30,000 psi & 120° F
(Specific Gravity = 0.565)

2. (411.147 lbs $H_2O$/hr) (0.565/0.9899) = 232 lbs $C_2H_4$/hr

Combining (1) & (2) and dividing, 3. 232 lbs/hr/300 cycles/sec = 0.773 lb-sec/hr-cycles For direct lbs/hr readout we define 4. 100 cycles = 1 lb/hr Thus 5. 100 cycles/1 lb/hr = 1

We can now multiply (3) by (5)

6. (0.773 lb-sec/hr-cycle) (100 cycle-hr/1 lb) = 77.3 seconds

To measure material other than this such as 3,000 psi at 80° F
Ethylene gas (S. G. = 0.427).

7. (77.3 seconds) (0.427/0.565) = 58.4 seconds

Figure 3:
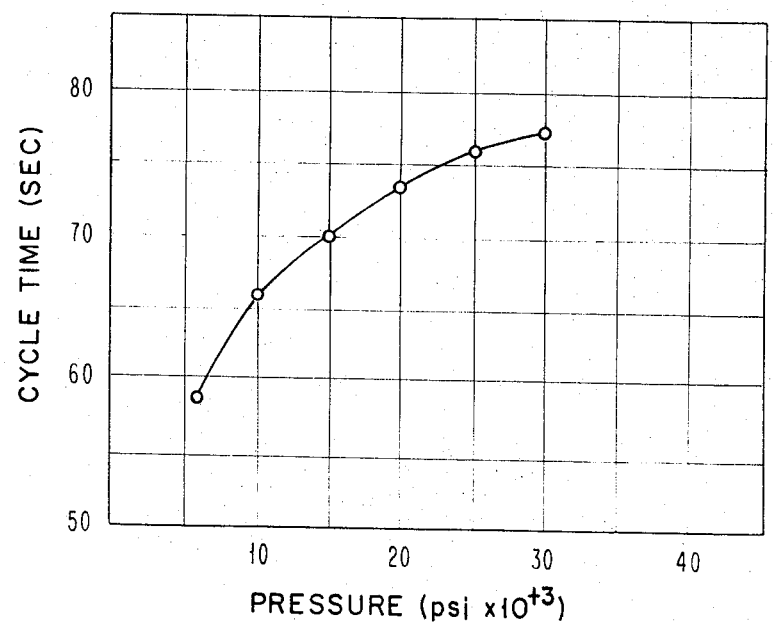
FIG. 3 is a graph depicting integrator time setting in which cycle time for the pulse counting operating is plotted against pressure for a particular fluid, the flow rate of which is to be measured.

By carrying out the above-indicated method for various densities, a plot can be drawn of cycle time versus a parameter that serves as a measure of density, such as gas pressure, for any given turbine. Such a plot is provided by FIG. 3 and, it will be seen, that it becomes an easy matter to find the required cycle time in accordance with changes in pressure for given fluid. It will be understood that with the use of other mathematical manipulation, the cycle time could be calculated to yield flow data in any units pertinent to the system being studied.

What is claimed is:

1. Apparatus adapted to provide a time-integrated measurement of the rate of fluid flow in pulsating flow system, said system being characterized by wide variations in flow rate over a pre-determined cycle time, comprising:
   means for generating pulses in accordance with the instantaneous flow rate;
   counting means, coupled to said pulse generating means, for counting the number of said pulses over immediately repeated, successive time intervals of equal duration, each time interval being at least approximately as long as said predetermined cycle time;
   means for resetting said counting means immediately after each time interval; and
   display means, coupled to said counting means for providing a direct decimal readout of said flow rate, including means for displaying, during a succeeding time interval, the total count obtained in a preceding time interval.

2. Apparatus as defined in claim 1, further comprising transfer memory means adapted to store digital information received from said counting means, and means to transfer such information, following completion of each of said successive time intervals, from said counting means to said transfer memory means.

3. Apparatus as defined in claim 2 in which said display means is connected to said transfer memory means for displaying the count stored in said memory means.

4. Apparatus as defined in claim 1 in which said pulse generating means comprises a turbine device disposed in said fluid flow.

5. Apparatus as defined in claim 1 in which said counting means comprises a group of binary coded decimal counters, and said display means comprises a decoder device and a decimal readout device.

6. Apparatus as defined in claim 5, further including means for resetting said group of counters following operation of said transfer means.

7. Apparatus as defined in claim 1 further including visual indicator means for indicating the instantaneous flow rate.

8. Apparatus as defined in claim 1, further including timing means adapted to establish the duration of the successive time intervals, in accordance with the selected units of measurement and with the calibration of said pulse generating means, so as to obtain the direct decimal readout of the flow rate.

9. Apparatus as defined in claim 8 in which the duration of the successive time intervals for said timing means is in accordance with the specific gravity of the particular fluid whose flow rate is being measured, so as to obtain the readout of flow rate in weight/unit time.

10. Apparatus as defined in claim 8, further comprising transfer memory means adapted to store digital information received from said counting means, and means to transfer such information, following completion of each of said successive time intervals, from said counting means to said transfer memory means.

11. Apparatus as defined in claim 10 in which said display means is connected to said transfer memory means for displaying the count stored in said memory means.

12. Apparatus as defined in claim 8 in which said pulse generating means comprises a turbine device disposed in said flow.

13. Apparatus as defined in claim 8 in which said counting means comprises a group of binary coded decimal counters, and said display means comprises a decoder device and a decimal readout device.

14. Apparatus as defined in claim 13, further including means for resetting said counters following operation of said transfer means.

15. Apparatus as defined in claim 8, further including visual indicator means for indicating the instantaneous flow rate.

* * * * *